United States Patent [19]
Fukui et al.

[11] Patent Number: 5,704,401
[45] Date of Patent: Jan. 6, 1998

[54] WASHING MACHINE HOSE

[75] Inventors: Kouki Fukui; Hiroyuki Masui; Toshihiro Nakanishi, all of Osaka, Japan

[73] Assignee: Totaku Industries, Inc., Takatsuk, Japan

[21] Appl. No.: 632,363

[22] Filed: Apr. 10, 1996

[30] Foreign Application Priority Data

Apr. 12, 1995 [JP] Japan ................................. 7-112411

[51] Int. Cl.$^6$ ........................................................ F16L 11/11
[52] U.S. Cl. ........................... 138/121; 138/137; 138/141; 138/119; 138/DIG. 11
[58] Field of Search ................... 138/121, 122, 138/137, 141, 119, DIG. 7, DIG. 11; 68/208

[56] References Cited

U.S. PATENT DOCUMENTS

| | | | |
|---|---|---|---|
| 3,234,969 | 2/1966 | DuMont | 138/121 |
| 3,838,713 | 10/1974 | Tubbs | 138/109 |
| 3,902,531 | 9/1975 | Thawley | 138/137 |
| 4,283,447 | 8/1981 | Flynn | 138/137 |
| 5,305,799 | 4/1994 | Dal Palù | 138/109 |
| 5,311,753 | 5/1994 | Kanao | 138/119 |
| 5,472,746 | 12/1995 | Miyajima et al. | 138/137 |
| 5,507,319 | 4/1996 | Kanao | 138/141 |
| 5,560,398 | 10/1996 | Pfleger | 138/121 |

FOREIGN PATENT DOCUMENTS 51485 6/1991 Japan.

*Primary Examiner*—David Scherbel
*Assistant Examiner*—James F. Hook
*Attorney, Agent, or Firm*—Whitham, Curtis, Whitham & McGinn

[57] ABSTRACT

With a desired intermediate portion as a boundary, in a hose, a corrugated wall is formed on one side of the boundary while a scalene-triangularly corrugated wall is formed on the other side of the boundary, the whole of a hose is formed of a soft synthetic resin material and a hard synthetic resin material in the form of a double-layered wall. The soft synthetic resin material is made thicker than the hard synthetic resin material in a portion on a connection cylindrical portion side while the hard synthetic resin material is made thicker than the soft synthetic resin material in a portion on a drainage cylindrical portion side.

9 Claims, 4 Drawing Sheets

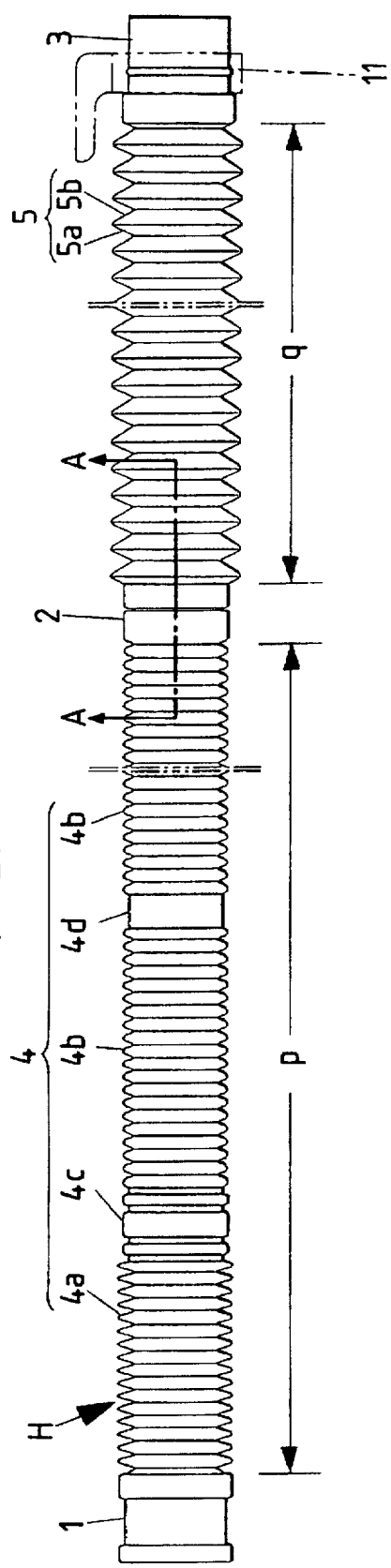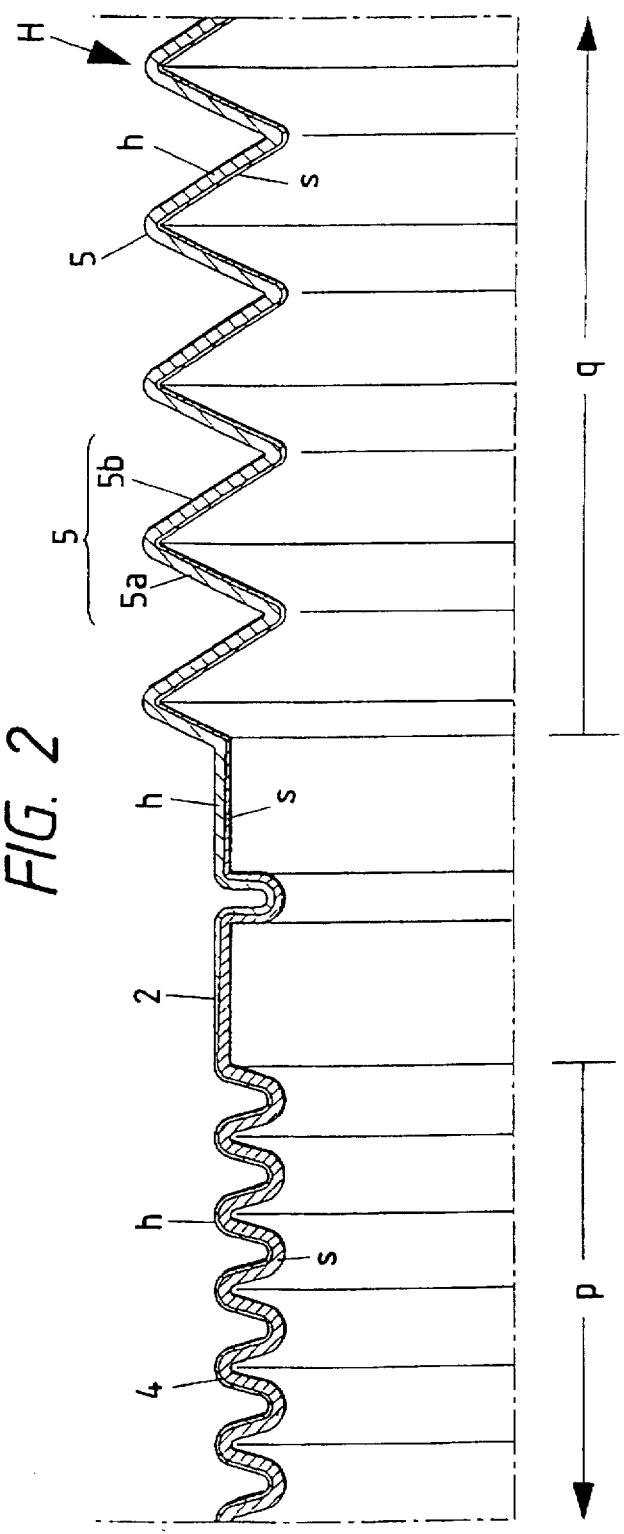

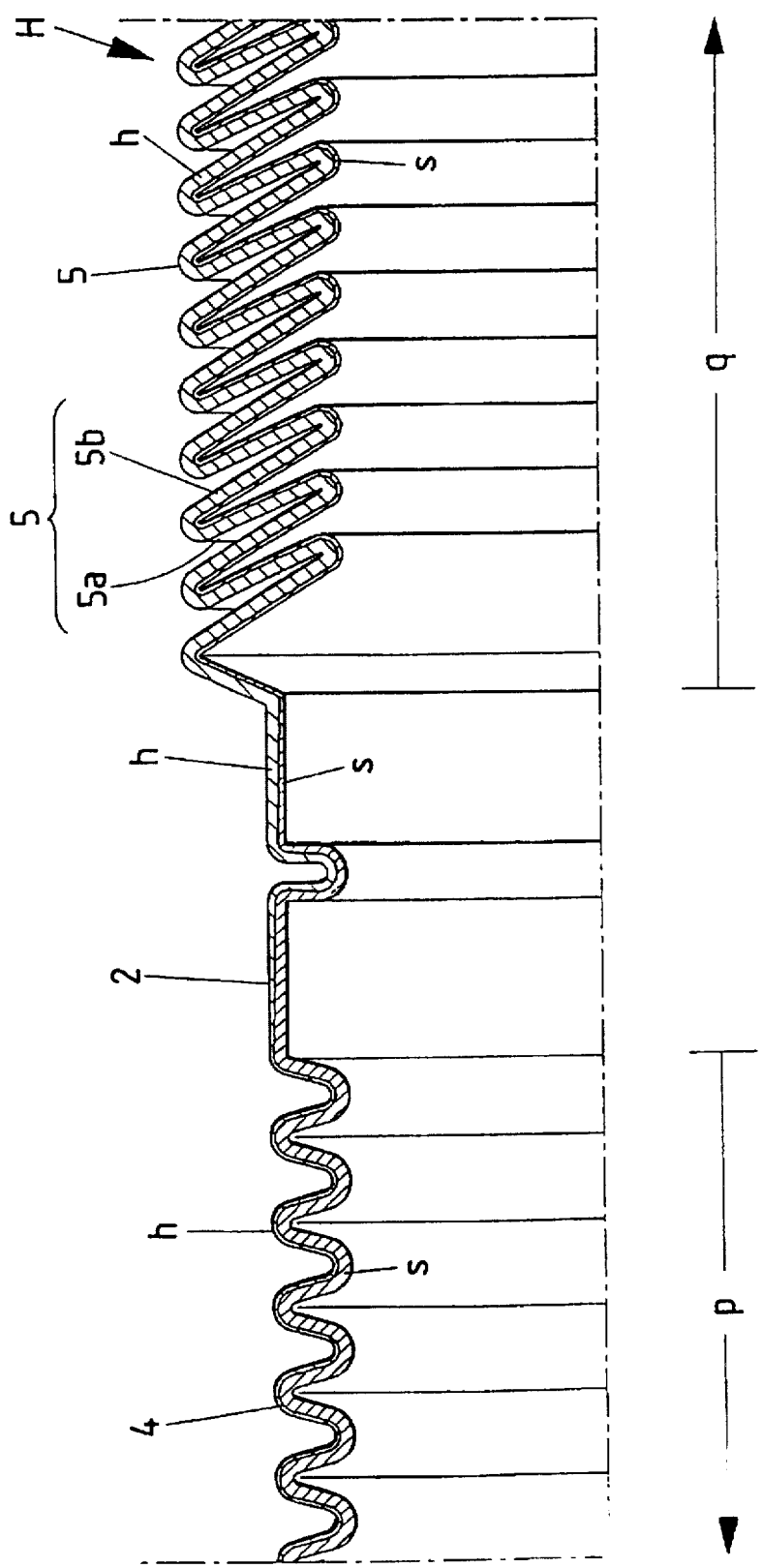

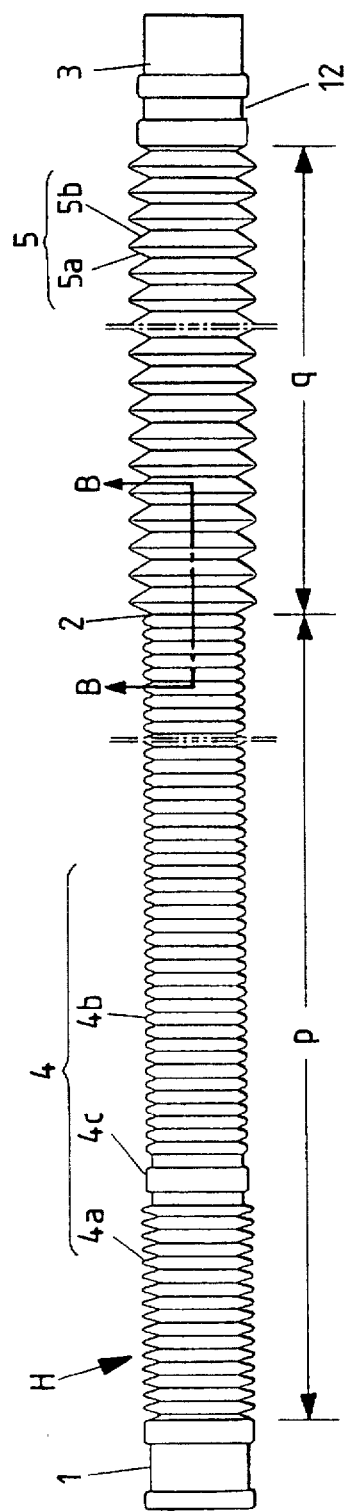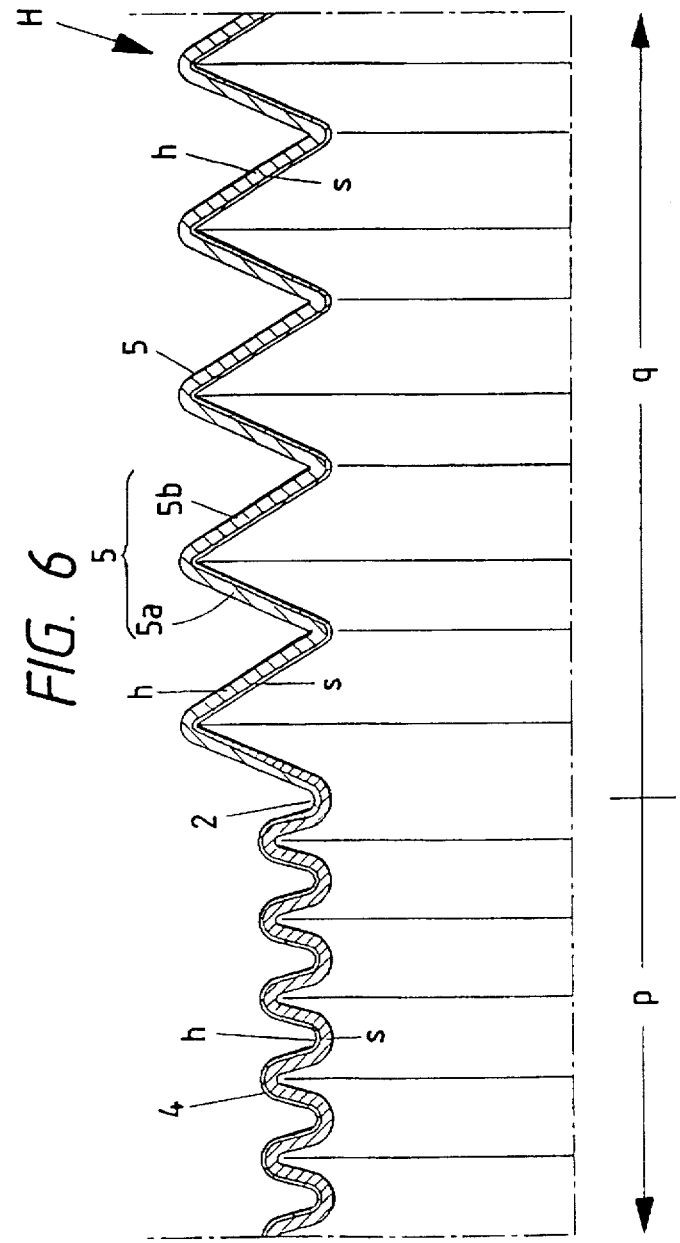

WASHING MACHINE HOSE

BACKGROUND OF THE INVENTION

The present invention relates to a drainage hose which is adapted to be attached to an electric washing machine.

Such a washing machine hose includes two kinds of hoses, that is, an internal hose which is attached to the inside of a washing machine, and an external hose which is connected to this internal hose and disposed along the outer housing of the washing machine. The inventor had already proposed another hose the whole of which is a single, continuous, long hose in place of such two kinds of hoses used separately internally and externally, and in which the portion disposed outside the washing machine is made to have a wall in the form of a triangular corrugated wall corresponding to two sides of a scalene triangle so that an inclined wall on the shorter side in the wall portion shaped into the triangularly corrugated wall can be moved into an approximately parallel posture to the inner surface side of an inclined wall on the other longer side, and can keep this moved shrinkage posture by itself (for example, see Japanese Utility Model Unexamined Publication No. Hei. 5-1485).

With regard to the former of conventionally known hoses of the type which uses two kinds of internal and external hoses, there is a problem that a process to connect the internal hose and the external hose is required, and water is apt to leak out of this connection portion. On the other hand, with regard to the single continuous long hose which has been proposed as means to solve such a problem, it is necessary to have such a structure that an inclined wall on the shorter side in a wall portion shaped into a scalene-triangular wall moves toward the inner surface side of an inclined wall on the longer side and this shrinkage posture is kept by itself. For this reason, it is necessary to use a resin material which is hard to some extent. On the other hand the portion formed into an annularly corrugated shape lacks flexibility if the whole of the hose is formed from a hard resin material. This hose has therefore such problems that overwork and damage occur easily in a bending portion between a vertical posture for making connection to a drainage pipe in a washing machine and a horizontal posture for making extension to the outside of the washing machine, and that vibrations of a washing tub cannot be sufficiently absorbed to thereby affect the washing machine body, and so on.

Therefore, the inventor aimed at solving not only the problems belonging to the former conventional washing machine hose using two kinds of hoses, but also the problems belonging to the latter long hose and considered and studied repeatedly how to form a continuously integrated hose by using a hard resin material for the scalene-triangularly corrugated portion and a soft resin material for an annularly corrugated portion. The inventor however found that it was extremely difficult to form a perfect connection portion between these materials that are different in hardness from each other, without causing any roughness in the materials, without any unnatural appearance in the connection portion, and without reducing strength, and particularly to carry out mass-production of such hoses continuously.

SUMMARY OF THE INVENTION

The present invention has been made to overcome all the difficulties of the conventional hoses, and an object of the invention is to provide a washing machine hose in which a scalene-triangular wall portion has a required hardness so that a shorter-side inclined wall moves toward the inner surface side of a longer-side inclined wall and the posture can surely be kept by itself; a corrugated wall portion has a required flexibility to be bent easily, so that the portion to be bent within the washing machine can be used for a long term without suffering from any overwork or damage; no roughness arises in the material in a connection portion between the scalene-triangularly corrugated wall portion and the corrugated wall portion, and the connection portion can be formed perfectly without causing any unnatural appearance and without reducing strength; and particularly a structure suitable for continuous production can be obtained.

In order to attain the foregoing object, a washing machine hose according to the present invention comprises: a connection cylindrical portion provided on one end of the hose and adapted to be connected to a drainage pipe in a washing machine; an intermediate cylindrical portion disposed in a required intermediate portion of the hose; a drainage cylindrical portion formed on the other end of the hose; an annularly corrugated wall formed entirely or almost over a portion between the connection cylindrical portion and the intermediate cylindrical portion; and a scalene-triangularly corrugated wall formed entirely or almost over a portion between the intermediate cylindrical portion and the drainage cylindrical portion. The whole of the hose is formed of a soft synthetic resin material and a hard synthetic resin material in the form of a consecutively integrated inside-outside double-layered wall in a manner so that the soft synthetic resin material is thicker than the hard synthetic resin material in the portion between the intermediate cylindrical portion and the connection cylindrical portion, while the hard synthetic resin material is thicker than the soft synthetic resin material in the portion between the intermediate cylindrical portion and the drainage cylindrical portion, so that a shorter-side inclined wall in the scalene-triangularly corrugated wall is changeable in a shrinkage posture to move to the inner surface side of the other longer-side inclined wall and this moved shrunk posture can be kept by itself.

In carrying out the washing machine hose of the invention, the annularly corrugated wall may be constituted by wall portions different in kind, for example, by a large-diameter annularly corrugated wall and a small-diameter annularly corrugated wall. An internal fixing cylindrical portion to be fixed to the inside of the washing machine and a washing machine-wall fixing cylindrical portion to be fixed on a wall of the washing machine may be formed in required places of the annularly corrugated wall. In addition, the intermediate cylindrical portion may have a cylindrical portion of a predetermined length which is a boundary portion between the annularly corrugated wall and the scalene-triangularly corrugated wall so as to obtain a structure having no smooth cylindrical portion of substantially a predetermined length.

In the washing machine hose according to the present invention and having such a structure as mentioned above, the portion on the drainage cylindrical portion side is disposed outside the washing machine, and the portion of the scalene-triangularly corrugated wall is brought into an extension posture or a shrinkage posture so as to change the whole length of the hose largely to thereby make it possible to drain water to a drainage hole near the washing machine or to drain water to a drainage hole away from the washing machine. In addition, when the hose is not in use, the portion of the scalene-triangularly corrugated wall is changed to a desired length so that the hose can be put along the washing machine wall and the drainage cylindrical portion is engaged with a hose latch in a manner similarly to that in the case of a general washing machine.

BRIEF DESCRIPTION OF THE DRAWINGS

FIG. 1 is a front view of a hose in a first embodiment, the intermediate portion of which is omitted partially;

FIG. 2 is an enlarged longitudinally sectional view taken on line A—A in FIG. 1;

FIG. 3 is a partially transformed longitudinally sectional view of FIG. 2;

FIG. 5 is a front view of a second embodiment, corresponding to FIG. 1; and

FIG. 6 is an enlarged longitudinally sectional view taken on line B—B in FIG. 5.

DETAILED DESCRIPTION OF THE PREFERRED EMBODIMENTS

Figure 4:
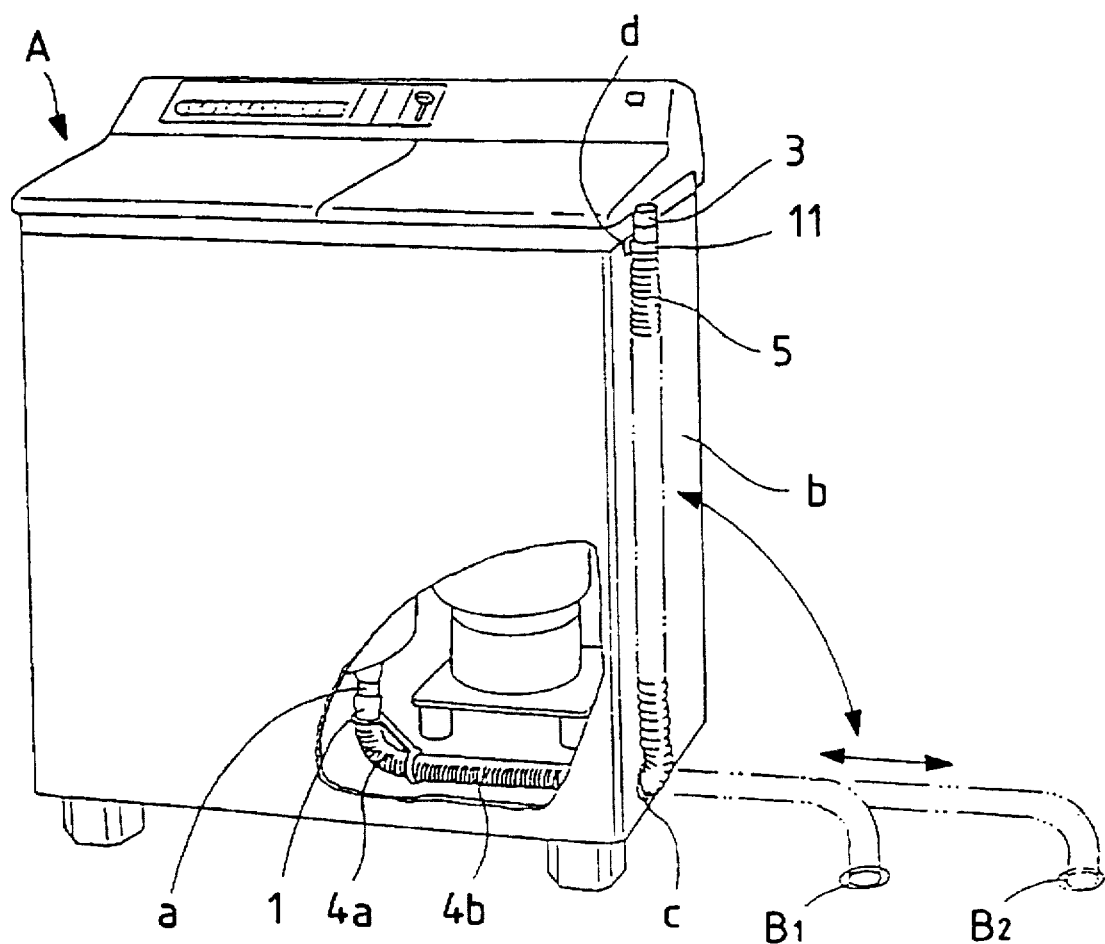
FIG. 4 is a partially cut-off perspective view illustrating the state where the hose is attached to a washing machine.

Preferred embodiments of the present invention will be described below with reference to the drawings.

FIGS. 1 to 4 are views illustrating a hose H as a first embodiment of the present invention: FIG. 1 is a view illustrating the whole structure of the hose H cut off partially; FIG. 2 is an enlarged view illustrating the portion taken on sectional line A—A in FIG. 1; FIG. 3 is a view illustrating the state where the portion of a scalene-triangularly corrugated wall 5 shown in FIG. 2 is changed to a shrinkage posture; and FIG. 4 is a view illustrating the state where the hose H has been fitted to a washing machine A.

In a washing machine hose according to the present invention, a synthetic resin material, such as polypropylene resin, which can change its hardness easily is used. Two materials, a soft material s which is high in flexibility and another comparatively hard material h which has appropriate rigidity and elasticity are extruded in the form of two layers. The two layers form a single continuous hose in which a portion to be attached and arranged in the inside of a washing machine A and a portion to be arranged so as to project to the outside through a hose insertion hole c formed in a washing machine wall b of the washing machine A are continuously formed into one body, as shown in FIG. 4 by way of example.

As shown in FIG. 1, specifically, the hose H has such a structure that a connection cylindrical portion 1 to be connected to a drainage pipe a in the washing machine A is formed on one end side (left side in the drawing), a cylindrical portion 2 is formed in a required intermediate portion and, a drainage cylindrical portion 3 is formed on the other end side (right side in the drawing). An annularly corrugated wall 4 is formed over a portion p between the connection cylindrical portion 1 and the intermediate cylindrical portion 2, and a corrugated wall 5 shaped into a substantially triangularly shaped corrugated pattern (i.e., wave) corresponding to two sides of a scalene triangle (hereinafter referred to "scalene-triangularly corrugated wall" for the sake of convenience) is formed over a portion g between the intermediate cylindrical portion 2 and the drainage cylindrical portion 3. The above-mentioned soft and hard materials s and h are arranged on the inner and outer circumferential surface sides respectively, and fused to each other so that a double-layered wall composed of the soft and hard materials is formed all over the hose. Further, the respective thicknesses of the soft and hard materials s and h are varied gradually in the intermediate cylindrical portion 2 as shown in enlargement in FIG. 2 so that, with this intermediate cylindrical portion 2 as a boundary, the hard synthetic resin material h is made thinner and the soft synthetic resin material s is made thicker in the portion p on the connection cylindrical portion 1 side (left portion in the drawing) from the intermediate cylindrical portion 2 while the soft synthetic resin material s is made thinner and the hard synthetic resin material h is made thicker in the portion g on the drainage cylindrical portion 3 (right portion in the drawing) from the intermediate cylindrical portion 2.

With such a structure, the annularly corrugated wall 4 formed on the connection cylindrical portion 1 side is flexible and can be easily bent, and the scalene-triangularly corrugated wall 5 formed on the drainage cylindrical portion 3 side is rigid and resilient enough for the specific application. Accordingly, if a force in the direction of the axis of the hose H is exerted on the hose H, the inclined wall 5a can move easily toward the inner surface side of the inclined wall 5b by a self-resilient force as shown in FIG. 3. This shape (i.e., shrinkage posture) can be easily kept by the washing machine hose itself because of the self-resilient force.

Further, as shown in FIG. 1, the hose H of this embodiment has such a structure that a predetermined-length portion 4a formed in the portion of the annularly corrugated wall 4 adjacent to the connection cylindrical portion 1 has a diameter larger than that of another annularly corrugated portion 4b in order to the portion 4a to be bent easily so as to be connected to the drainage pipe a of the washing machine, because this portion 4a directly receives vibrations of the drainage pipe a. Further, an in-washing machine fixing cylindrical portion 4c for fixing the hose in the inside of the washing machine A is formed between the large-diameter corrugated portion 4a and the corrugated portion 4b, and a washing machine-wall fitting cylindrical portion 4d for fixing the hose to the hose insertion hole c formed in the washing machine wall b of the washing machine A is formed in a required intermediate portion of the corrugated portion 4b.

The hose H having such a structure may have means for attaching the hose to the washing machine A in the same manner as that in a general washing machine hose, as shown in FIG. 4. A hook 11 for engagement with a hose latch d attached to the washing machine A is attached to the drainage cylindrical portion 3 of the hose H in this embodiment in practical use, as shown by a virtual line in FIG. 1.

When the hose H attached to the washing machine A in such a manner as described above is to be used, the drainage cylindrical portion 3 is first detached from the hose latch d, and inserted into a required drainage hole B. In this case, as shown in chain lines in FIG. 4, the hose can be shrunk or extended suitably to the position of the drainage hole even if the drainage hole is at a position $B_1$ near the washing machine A or at a position $B_2$ away therefrom so that water can be drained through the hose H in an approximately horizontally straight posture.

The washing machine hose according to the present invention may be realized with such a structure as shown in FIGS. 5 and 6 as a second embodiment. That is, the intermediate cylindrical portion 2 is made to be a boundary between the annularly corrugated wall 4 and the scalene-triangularly corrugated wall 5. The respective thicknesses of the soft and hard materials s and h are varied gradually with the intermediate cylindrical portion 2 as a boundary as shown in enlargement in FIG. 6 in a manner so that the soft synthetic resin material s is thicker than the hard synthetic resin material h in the portion p on the connection cylindrical portion 1 side (left portion in the drawing) from the intermediate cylindrical portion 2, while the hard synthetic resin material h is thicker than the soft synthetic resin material s in the portion g on the drainage cylindrical portion 3 side (right portion in the drawing) from the intermediate cylindrical portion 2, similarly to the first embodiment.

In addition, a small-diameter corrugated portion 4b is formed all over the section between the in-washing machine fixing cylindrical portion 4c and the intermediate cylindrical portion 2 in the annularly corrugated wall 4 in this embodiment, while the washing machine-wall fitting cylindrical portion 4d shown in the first embodiment is not formed. However, the attachment to the washing machine wall may be performed by use of the corrugated portion 4d at a desired place. In addition, the in-washing machine fixing cylindrical portion 4c is not always necessary, the hose may be fixed at a desired portion of the corrugated portion 4a or 4b. The drainage cylindrical portion 3 in this embodiment has a shape where a small-diameter cylindrical portion 12 is formed between two large-diameter annular portions so that the hose can be engaged with the hose latch d U-shaped in plan and attached to the washing machine A by pushing the small-diameter cylindrical portion 12 to the hose latch d.

A material forming the hose H according to the present invention may be, for example, formed of any synthetic resin material such as polyethylene, polyvinyl chloride other than polypropylene mentioned in the first embodiment. Preferably, the soft synthetic resin material s and the hard synthetic resin material h are those homogeneous with each other or those which can be fused with each other easily.

Although the embodiments regarded as representatives of the present invention were described, the present invention is not always limited to the illustrated structure of these embodiments, but may be realized in an appropriate modification within a scope of providing the above-mentioned constituents according to the present invention, and attaining the object of the present invention and having the following effects.

As is apparent from the above description, the present invention has such a structure that with a desired intermediate cylindrical portion of a hose as a boundary, one side of the boundary where the hose is attached to the inside of a washing machine is made to have an annularly corrugated wall while the other drainage pipe side is made to have a scalene-triangularly corrugated wall, and that the whole of the hose is formed of a soft synthetic resin material s and a hard synthetic resin material h so as to be in the form of a consecutively integrated inside-outside double-layered wall, and with the intermediate cylindrical portion as a boundary, the soft synthetic resin material s is made thicker than the hard synthetic resin material h in a portion p on the in-washing machine attachment side, while the hard synthetic resin material h is made thicker than the soft synthetic resin material s in a portion g on the drainage pipe side. Accordingly, the wall portion having a scalene-triangular shape has a required hardness so that a shorter-side inclined wall therein moves toward the inner surface side of the longer-side inclined wall and the posture can surely be kept by itself, and in addition, the wall portion having an annularly corrugated shape has a required flexibility so that it can be bent easily so that this portion of the washing machine hose is easily bent and has a long useful life.

The hose as a whole is formed continuously and integrally without any joint in the length direction. Accordingly, there are conspicuous effects that there arises no roughness or no unnatural appearance on the material in the boundary portion between the scalene-triangularly corrugated portion and the annularly corrugated portion, the strength is not weakened, and a perfect non-joint shape can be formed both in the inner and outer surface sides of the hose. In addition, the inventive hose may be mass-produced efficiently.

What is claimed is:

1. A washing machine hose having a first end and a second end opposite said first end, said washing machine hose comprising:
    a connection cylindrical portion positioned on said first end of said washing machine hose for being connected to a drainage pipe of a washing machine;
    an intermediate cylindrical portion disposed along an intermediate portion of said washing machine hose;
    a drainage cylindrical portion formed on said second end of said washing machine hose;
    an annularly corrugated wall formed between said connection cylindrical portion and said intermediate cylindrical portion; and
    a scalene-triangularly corrugated wall formed between said intermediate cylindrical portion and said drainage cylindrical portion;
    an integrated double-layered wall having a first layer comprising a soft synthetic resin material and a second layer comprising a hard synthetic resin material, and
    wherein said soft synthetic resin material has a thickness greater than that of said hard synthetic resin material in said annularly corrugated wall and said hard synthetic resin material has a thickness greater than that of said soft synthetic resin material in said scalene-triangularly corrugated wall, such that said scalene-triangularly corrugated wall has a higher rigidity than that of said annularly corrugated wall.

2. A washing machine hose according to claim 1, wherein said annularly corrugated wall includes a large-diameter corrugated wall portion and a small-diameter corrugated wall portion.

3. A washing machine hose according to claim 1, wherein said annularly corrugated wall includes an internal fixing cylindrical portion for being connected to an inside of said washing machine and a washing machine-wall fixing cylindrical portion for being connected to a wall of said washing machine.

4. A washing machine hose according to claim 1, wherein said intermediate cylindrical portion comprises a boundary portion between said annularly corrugated wall and said scalene-triangularly corrugated wall.

5. A washing machine hose as in claim 1, wherein said double-layered wall extends a full length of said washing machine hose.

6. A washing machine hose as in claim 1, wherein said scalene-triangularly corrugated wall includes corrugations, each of said corrugations including a first linear portion pivotally connected to a second linear portion, wherein an angle between said first linear portion and said second linear portion decreases as said scalene-triangularly corrugated wall narrows and said angle increases as said scalene-triangularly corrugated wall widens.

7. A washing machine hose as in claim 1, wherein said scalene-triangularly corrugated wall has a predetermined rigidity to independently maintain a shape and said annularly corrugated wall lacks said predetermined rigidity.

8. A washing machine hose as in claim 1, wherein said scalene-triangularly corrugated wall is selectively expandable and contractible, said scalene-triangularly corrugated wall having a predetermined rigidity to independently maintain an expanded or contracted length.

9. A washing machine hose as in claim 1, wherein said thickness of said first layer and said thickness of said second layer are inversely varied along a length of said intermediate cylindrical portion.

* * * * *